(12) United States Patent
Thomason et al.

(10) Patent No.: US 9,579,882 B2
(45) Date of Patent: Feb. 28, 2017

(54) HIGH DURABILITY PLIABLE PRINT ROLLER

(71) Applicant: Pacesetter Graphic Service Corporation, Acworth, GA (US)

(72) Inventors: Alan Thomason, Acworth, GA (US); Robert Allen, Acworth, GA (US)

(73) Assignee: Pacesetter Graphic Service Corporation, Ackworth, GA (US)

( * ) Notice: Subject to any disclaimer, the term of this patent is extended or adjusted under 35 U.S.C. 154(b) by 496 days.

(21) Appl. No.: 14/190,438

(22) Filed: Feb. 26, 2014

(65) Prior Publication Data

US 2015/0239228 A1 Aug. 27, 2015

(51) Int. Cl.
*B41F 31/26* (2006.01)
*B29C 53/60* (2006.01)
(Continued)

(52) U.S. Cl.
CPC .............. *B41F 31/26* (2013.01); *B29C 53/60* (2013.01); *B29D 99/0035* (2013.01);
(Continued)

(58) Field of Classification Search
CPC ...................................................... B41F 31/26
See application file for complete search history.

(56) References Cited

U.S. PATENT DOCUMENTS 2,204,383 A * 6/1940 Safford ................... B41N 7/06
156/154

3,594,255 A * 7/1971 Budinger ................. B41N 7/04
101/148
(Continued)

FOREIGN PATENT DOCUMENTS

| GB | 1365912 A | * | 9/1974 |
| WO | 9931178 A1 | | 6/1999 |
| WO | 02074850 A1 | | 9/2002 |
| WO | 03020817 A1 | | 3/2003 |

OTHER PUBLICATIONS

"Uses of BASF Delaminated Hydrous Kaolin in Tires"; BASF the Chemical Company; p. 1-2; Brochure, No publication date.
(Continued)

*Primary Examiner* — Jeff Aftergut
(74) *Attorney, Agent, or Firm* — Michael J. Mehrman; Mehrman Law Office

(57) ABSTRACT

Improved pliable print rollers for high speed drink can printing machines increase the pliable roller life five- to ten-fold at comparable ink thickness and machine speed. The improved performance results from the selection of materials utilized including a combination of elastomers, and in some case an essentially oil-free composition, and an associated manufacturing process not previously utilized to create pliable print rollers for high speed drink can printing machines. In particular a particular embodiment, the composition includes a combination of elastomers (e.g., 75% polyisoprene and 25% polybutadiene), a filler (e.g., silica), a curing agent (e.g., peroxided), and other additives (e.g., pigment, antioxidant, antiozonant) with little or no oil added as a softener. An illustrative composition including 150 parts by weight contains 100 parts elastomer, 35 parts filler, 4 parts curing agent, and 11 parts other additives (i.e., zero parts oil softener).

7 Claims, 5 Drawing Sheets

(51) Int. Cl.
*B29D 99/00* (2010.01)
*B41F 17/22* (2006.01)
*B41N 7/06* (2006.01)
*B32B 37/00* (2006.01)

(52) U.S. Cl.
CPC ............... *B41F 17/22* (2013.01); *B41N 7/06* (2013.01); *B32B 2037/0069* (2013.01); *Y10T 428/31931* (2015.04)

(56) References Cited

U.S. PATENT DOCUMENTS

| | | |
|---|---|---|
| 6,624,235 B1 | 9/2003 | Waddell et al. |
| 6,989,067 B2 * | 1/2006 | Armstrong, Jr. ....... B65H 81/08 156/117 |
| 7,019,063 B2 | 3/2006 | Wada et al. |
| 2004/0063859 A1 | 4/2004 | Waddell et al. |
| 2004/0132867 A1 | 7/2004 | Oka et al. |
| 2004/0135129 A1 | 7/2004 | Hattori et al. |

OTHER PUBLICATIONS

International Search Report and Written Opinion dated Nov. 3, 2014 for Application No. PCT/US2014/019888.

\* cited by examiner

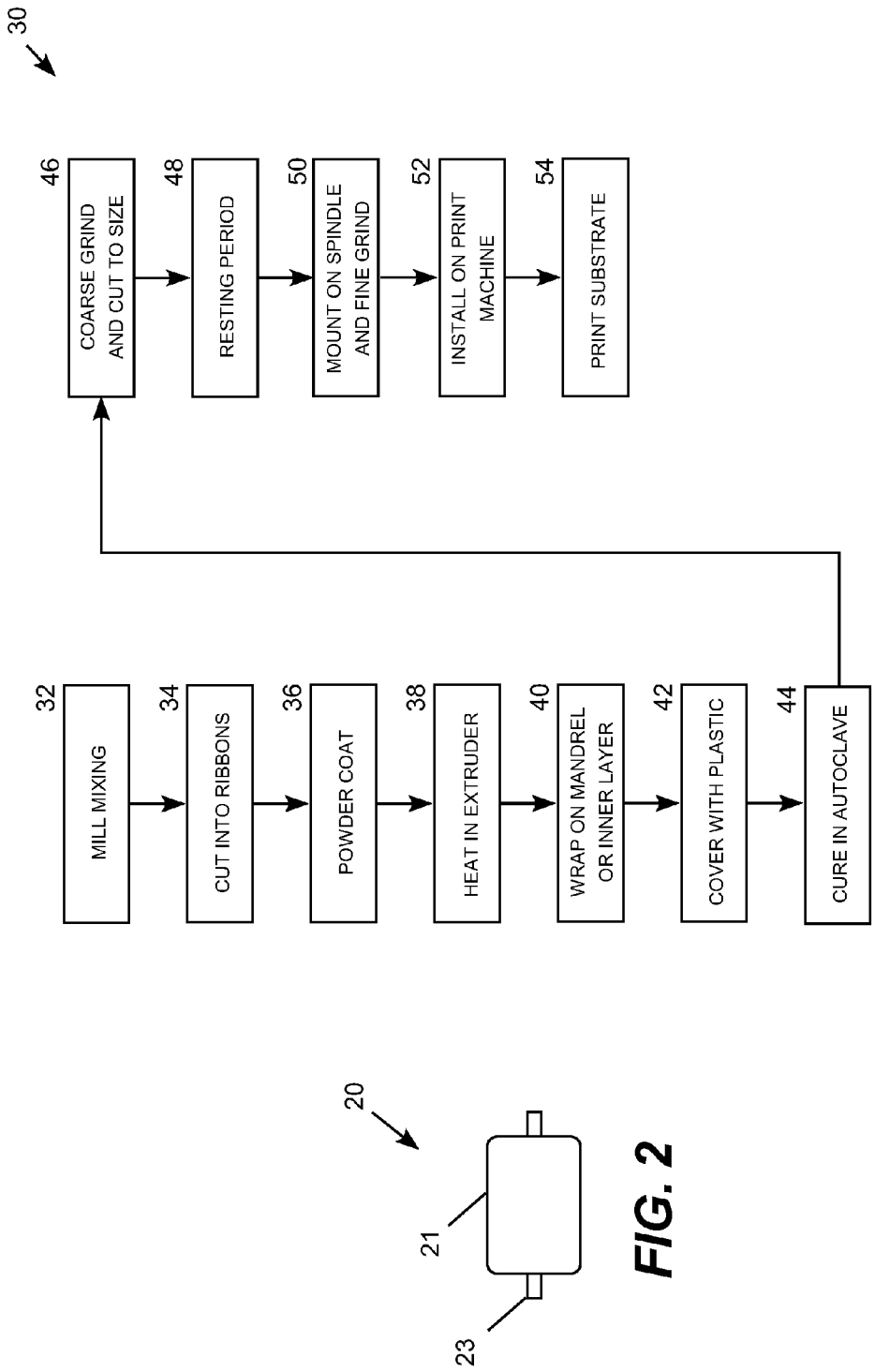

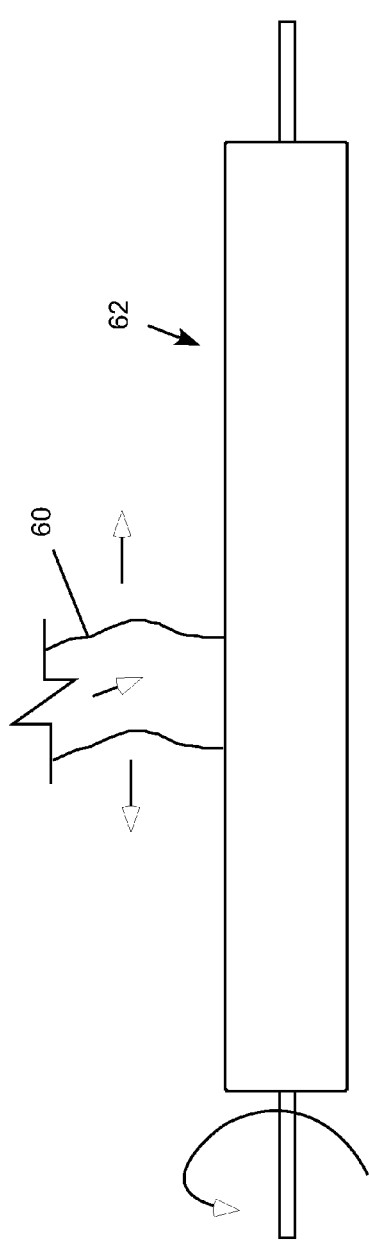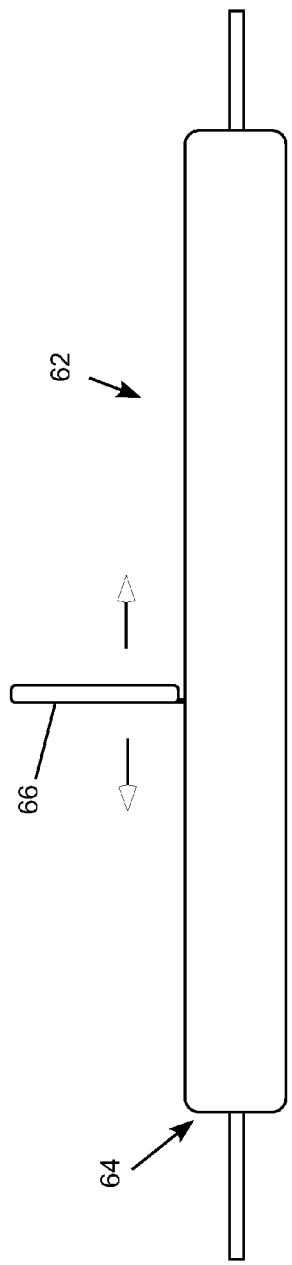
FIG. 4
FIG. 5

| COMPONENT | PART BY WEIGHT | % BY WEIGHT |
|---|---|---|
| ELASTOMER<br>- POLYISOPRENE 75%<br>- POLYBUTADIENE 25% | 100 | 67% |
| FILLER<br>- SILICA | 35 | 23% |
| CURING AGENT<br>- DICUMYL PEROXIDE | 4 | 3% |
| OTHER ADDITIVES<br>- PIGMENT<br>- ANTIOXIDANT<br>- ANTIOZONANT | 11 | 7% |
| SOFTENER<br>- OIL | 0 | >1% |
| TOTAL | 150 | 100% |

← ESSENTIALLY OIL FREE COMPOSITION

HIGH DURABILITY PLIABLE PRINT ROLLER

TECHNICAL FIELD

The present invention relates to industrial printing machines and, more particularly, to high durability pliable print rollers for transferring ink in high speed printing machines, such as those used to print drink cans.

BACKGROUND

Modern industrial printing machines, such as those used to print drink cans, often operate at high speeds in the range of 1,800 to 2,000 cans per minute. Drink can customers desire clear, sharp images and a high degree of consistency in image quality to support demanding advertising standards. The desire for crisp images often requires sharp, laser engraved images on the printing plates that create the images transferred onto the cans. There are a number of pliable and steel rollers in the ink train that transfer ink from a fountain and apply the cans. Certain pliable rollers known as the form rollers, which apply the ink directly to the engraved printing plates, are subject to the most intense wear and tear from coming into direct contact with the sharp edges of the print plates. The form rollers must also maintain a precise pressure to apply the desired thickness of ink to the printing plates while rotating at sufficient speed to support the high speed printing process.

The form rollers therefore tend to breakdown quickly requiring frequent replacement. In a conventional printing machine, the form rollers often require replacement every six to eight hours making them the most frequently replaced component in the assembly line dictating the machine duty cycle. The ink train may also include a number of other pliable rollers typically referred to as the ductor and transfer rollers. Although not subject to the same level of wear and tear as the form rollers, these other pliable print rollers also require regular maintenance and replacement on a regular basis. Replacing the print rollers requires shutting down the assembly line, which reduces the overall output and efficiency of the printing machine.

Holding other variables constant, harder pliable rollers generally last longer. But increasing the hardness of the pliable rollers presents a trade off in that harder rollers require higher pressure to apply the desired ink coating thickness, which increase energy usage, heat generation, and wear and tear on the rollers. The form rollers, in particular, are required to apply an ink coating having a desired thickness to the printing plates carried on the plate cylinder, which is typically measured as the width of the line laid down by a non-rotating form roller at a given pressure. For example, the line thickness standard may be 3/16 inch [0.476 cm], and a form roller with a 55 shore durometer hardness may require six lbs [2.7 kg] per inch [2.54 cm] of roller length (e.g., 30 lbs [13.6 kg] pressing a five inch [12.7 cm] roller against the plate cylinder) to apply a standard line width of 3/16 inch [0.476 cm]. On the other hand, a harder roller with a 65 shore durometer hardness may require eight lbs [3.6 kg] per inch [2.54 cm] of roller length (e.g., 40 lbs [18.1 kg] pressing a five inch [12.7 cm] roller against the plate cylinder) to apply the same standard line width of 3/16 inch [0.476 cm].

While harder rollers are generally expected to be more durable, they also require higher roller pressure to print the desired line width which, in turn, increases heat generation within the roller and wear and tear on the roller. As a result, harder rollers are not necessarily more durable in practice. Moreover, using harder rollers increases machine drag and energy consumption. Harder rollers may also experience lower surface resiliency causing them to perform poorly at higher pressures and machine speeds. As a result, the tradeoff balance conventionally adopted by the industry utilizes relatively firm form rollers (e.g., 60-65 shore durometer) that print crisp images at reasonably obtainable roller pressures (e.g., 35-40 lbs [15.9 to 18.1 kg] on a five inch [12.7 cm] roller) but require relatively frequent replacement (e.g., every six to eight hours). Having to shut down the printing machine to change out the form rollers every six to eight hours limits the continuous run duty cycle and is considered to be a major limitation in high speed drink can printing.

As a result, there is significant need for improved pliable print rollers with improved durability while still meeting the print quality, roll pressures, and line speeds demanded by modern industrial printing processes.

SUMMARY

The present invention may be embodied in a pliable print roller for an industrial printing machine that includes a roller body carried on a shaft. The roller body or a cover layer of the roller body includes a homogeneous composition of elastomers, filler, curing agent, and optionally one or more other additives. The preferred combination of elastomers is polyisoprene and polybutadiene, which may be in the proportion of about 75% polyisoprene and about 25% polybutadiene. The roller body may have a width dimension of about five inches [12.7 cm] and a diameter dimension in the range of about 3⅛ [7.9 cm] inches to about 3¾ [9.5 cm]. In a particular embodiment, the elastomer may be about 67% of the composition, the filler may be about 23% of the composition, the curing agent may be about 3% of the composition, and the other additives (if included) may be about 7% of the composition.

It should be noted that the elastomer(s), filler(s), curing agent(s), and other additive(s) may each consist of one or more materials, and the literal count (singular or plural) used to describe these components in this disclosure is utilized for grammatical convenience not to expressly limit any composition to having only one, or requiring more than one, material in each category unless otherwise specified. In particular embodiments, the curing agent may be dicumyl peroxide and the other additives may include a pigment, an antioxidant, and an antiozonant. The elastomers, fillers, curing agents and optionally other additives may also be utilized with essentially no oil added as a softening agent.

A method for manufacturing a pliable roller for an industrial printing machine includes combining ingredients including elastomer, filler, curing agent, and optionally other additives and mill mixing the ingredients for at least about an hour to create a homogeneous composition. A ribbon of the composition is formed, powder coated, and heated to a working temperature. The ribbon is then drawn out and wrapped onto a mandrel (or onto an inner layer for a multi-layer roller) to create a roll blank, which is covered with plastic and cured. After curing, coarse grinding and cutting to size, fine grinding brings the individual roller down to the desired finished diameter. Several rollers, such as six five inch [12.7 cm] rollers may be cut from a common blank.

In view of the foregoing, it will be appreciated that the present invention provides an improved pliable roller greatly increasing durability while meeting the print quality and line speeds demanded by modern industrial printing processes while meeting the print quality and line speed demanded by modern industrial printing processes. The specific techniques and structures for implementing particular embodiments of the invention and accomplishing the associated advantages will become apparent from the following detailed description of the embodiments and the appended drawings and claims.

BRIEF DESCRIPTION OF THE FIGURES

The numerous advantages of the invention may be better understood with reference to the accompanying figures in which:

FIG. 2 is a conceptual front view of a high durability pliable print roller.

FIG. 3 is a logic flow diagram of a process for manufacturing high durability pliable print rollers.

FIG. 4 is a conceptual front view of a roll blank created as part of the process for manufacturing the high durability pliable print rollers.

FIG. 5 is a conceptual front view of a roll blank with beveled corners created to facilitate coarse grinding as part of the process for manufacturing the high durability pliable print rollers.

FIG. 8 is an exemplary composition table for a particular embodiment of high durability pliable print rollers.

DETAILED DESCRIPTION OF EMBODIMENTS

Figure 1:
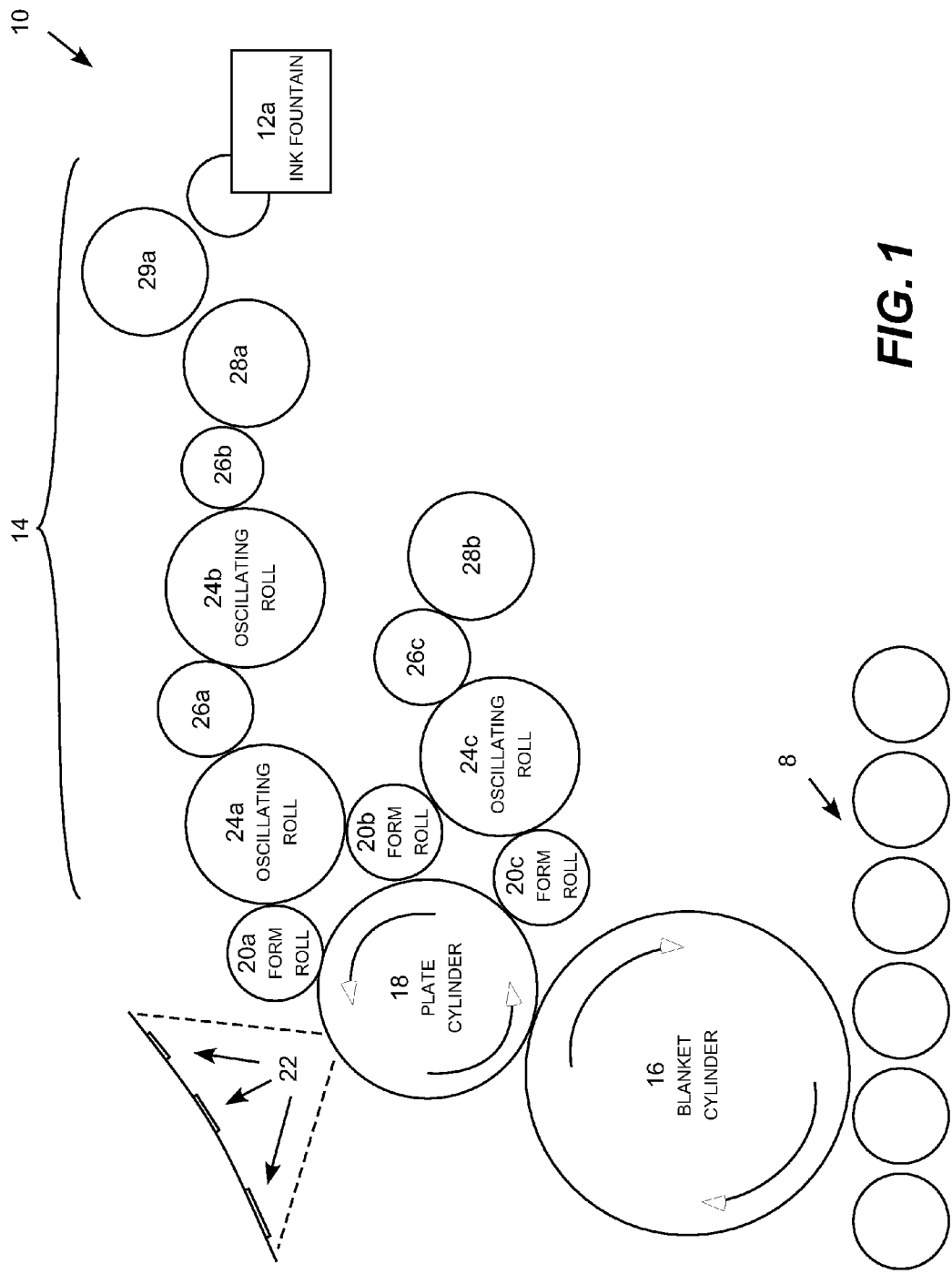
FIG. 1 is a conceptual illustration of an industrial drink can printing machine utilizing high durability pliable print rollers.

Embodiments of the invention may be realized in pliable print rollers for high speed printing machines, such as those used to print crisp, high quality images on drink cans. These machines require high quality, highly consistent printing at machine speeds often in the range of 1,800 to 2,000 cans per minute. Based on initial test results, the innovative print rollers described in this this disclosure are expected to increase the usable life of the form rollers by a factor of about five- to ten-fold at comparable ink thicknesses and machine speeds. The improved performance results from the selection of materials utilized in the rollers as well as the manufacturing process found to be suitable for constructing pliable print rollers from these materials.

In particular a particular embodiment, the composition may include a combination of polyisoprene and polybutadiene elastomers (e.g., 75% polyisoprene and 25% polybutadiene), a filler (e.g., silica), a curing agent (e.g., peroxided), and other additives (e.g., pigment, antioxidant, antiozonant) with little or no oil added as a softener. An illustrative composition including 150 parts by weight includes 100 parts elastomer, 35 parts filler, 4 parts curing agent, and 11 parts other additives (i.e., zero parts oil softener). While oil-free pliable rollers with this composition have been found to perform excellently, a small amount of oil may be added to as a softener to obtain a specific desired hardness as a matter of design choice. Altering the filler proportion and variations in additives may also be used to regulate the hardness.

Manufacturing oil-free or very low-oil rollers heavy in elastomer content relies on manufacturing process not previously utilized in the manufacture of pliable print rollers, which have traditionally been easier to work with due to the oil content. For example, slow mill mixing of the base ingredients is utilized rather than the much faster chopper mixing traditionally used for ingredient mixing. The admixture is then drawn into ribbons, which are powder coated and allowed to dry to facilitate handling. The dried ribbons are slowly heated to a working temperature (e.g., 180° F.) and slowly wound onto a mandrel (or onto an inner layer for a multi-layer roller) to build up a slightly oversized roll blank. The roll blank is then wrapped and cured in an autoclave (e.g., 270° for 5.5 hours), unwrapped and sent through coarse grinding prior to fine grinding to the desired size. Unlike oil-softened rollers, the corners of the elastomer heavy roll blank may be beveled to avoid catching on the roller edges and the linear travel rate of the coarse grinding is comparatively slow to avoid binding and burning that would occur at traditional grinding speeds. After coarse grinding, the roll blank is cut into individual rollers and allowed to set up overnight prior to fine grinding. Conventional oil-softened rollers do not require setting up overnight between coarse and fine grinding. Fine grinding is also performed at a significantly slower linear travel rate than traditionally utilized for oil-softened rollers. The corners of the individual rollers may also be beveled prior to fine grinding to avoid catching on the roller edges during fine grinding, which is also performed at a slower speed than for conventional rollers. In some case, the corners of the roll blank may not need to be beveled prior to coarse grinding due to the coarse nature of this step, and the edges of the individual rollers may be beveled typically at the end of the coarse grinding step to prepare the rollers for fine grinding.

In a particular manufacturing process, a coarse grinding wheel 66 spinning at about 7,000 rpm with a linear travel rate of about seven inches [17.8 cm] per minute has been found suitable for the coarse grinding stage. The roll blank is then cut into several rollers of the desired width and allowed to rest overnight (e.g., at least about 12 hours) between coarse grinding and fine grinding (finishing stage). Fine grinding brings the individual rollers down to the desired diameter. A fine grinding wheel spinning at about 7,000 rpm with a linear travel rate of about 2½ inches [6.35] per minute has been found suitable. A finished roller tolerance of 1.5 thousands to 1.0 thousandths of an inch [0.038 to 0.025 mm] has been achieved, which produces excellent print quality compared to conventional form rollers utilized in the industry.

The performance characteristics of the high durability pliable print rollers are unexpectedly superior to prior oil-softened print rollers. The conventional thinking for many years has been that form rollers require a significant oil component to provide sufficient softness to generate the desired line thickness at the desired roll pressure. While lower oil content produces harder rollers that lasted longer, they also require higher roll pressure to generate the same line thickness resulting in higher energy use. The present form rollers produce dramatically improved performance by predominantly utilizing elastomers with severely reduced or eliminated oil content. The resulting rollers demonstrate significantly lower hardness (about 55 shore durometer as opposed to 6-65 shore durometer for conventional pliable print rollers) but with significantly improved resilience (about 60% bounce as compared to 20% to 30% bounce for conventional rollers) and, most significantly, greatly improved surface durability during the printing process utilized in modern can printing machines.

Based on initial test results, printing life of about 72 hours or more is expected when using the new pliable form rollers to ink laser-engraved steal printing plates, as compared to six to eight hours for conventional oil-softened form rollers printing comparable ink thickness. Similarly, printing life of three months or more is expected when using the new pliable form rollers to ink polymer printing plates, as compared to about two weeks for conventional oil-softened form rollers printing comparable ink thickness. Generally, this translates into about a five- to ten-fold increase in printing life with the new pliable rollers.

The new pliable form rollers also produce significant energy savings as the hardness can typically be reduced to about 55 shore durometer from about 60-65 shore durometer for conventional form rollers. This translates into a reduction in roller pressure to about 5 to 6 lbs [2.3 to 2.7 kg] per roller inch [2.54 cm] from about 8 to 9 lbs [3.6 to 4.1 kg] per roller inch [2.54 cm] for conventional form rollers. This is expected to product a reduction in energy consumption of about 25% along with a similar reduction in roller heat from about 125 F [52 C] to about 95 F [35 C] with the new rollers.

The high durability pliable rollers also utilize inexpensive, readily available components (e.g., a combination of common elastomers, silica as a filler, peroxide as a curing agent, and ordinary additives) and readily accessible although previously unrealized manufacturing processes (e.g., slow mill mixing, extended curing, slow grinding, setting up overnight between coarse and find grinding, and so forth). This turns out to be a remarkably small tradeoff for the tremendous increase in the roller life which, based on the initial test results, is expected to be in the range of a five- to ten-fold improvement in print life in conventional drink can printing machines.

FIG. 1 is a conceptual illustration of an industrial drink can printing machine 10 utilizing high durability print form rollers 20a-20c. The machine prints crisp, high quality images onto drink cans 8 at a machine speed of 1,800 to 2,000 in accordance with current industry standards. While three or more ink colors are often printed, only one ink fountain and associated train of rollers is shown to avoid cluttering the figures. This particular figure therefore depicts one representative ink train for applying one color of ink, and several similar ink trains may be utilized to print multiple colors. For this ink train, the ink enters the machine at the ink fountain 12a and travels through an ink transfer series of rollers 14 and onto a blanket cylinder 16, which delivers the ink onto the cans 8 as they pass on an assembly line.

A plate cylinder 18 delivers the images to the blanket cylinder 16, which transfer the ink onto the cans. The form rollers 20a-20c that apply the ink to the plate cylinder 18 come into direct contact with the raised impressions 22 of the printing plates carried on the plate cylinder. There are usually several form rollers for each color to be printed with three form rollers 20a-20c shown in this particular ink train, which is typical for drink can printing. Although the specific configuration of the transfer series 14 is not an aspect to the invention, the representative drink can printing machine includes the three form rollers as well as two oscillating rollers 24a-24b that move into and out of engagement with the form rollers to apply ink to the proper portions of the form rollers. The oscillating rollers 24a-24b, in turn, are painted by distributor rolls 26a-26, which are fed by transfer rollers 28a-28b. An illustrative ductor roll 29a picks up ink from the fountain 12a and delivers the ink to the transfer roller. It will be appreciated that additional rollers may be included, the details of the transfer series will vary from machine to machine, and the rollers engaged for operation may vary on any given machine and between printing projects. It will therefore be understood that the specific transfer series 14 shown for machine 10 is provided to represent the operating environment for the high durability form rollers 20a-20c, which should not be construed as a limitation on their application. The doctor roller 29a and transfer rollers 28a-b are also pliable rollers that may utilize the inventive composition to improve their operating lives and performance characteristics.

The plate cylinder 18 carries the printing plates with the raised impressions 22 typically created by an engraving process, which bear the specific images to be printed. Laser-engraved steal printing plates and less demanding polymer printing plates are often utilized, and the type of plates may change from machine to machine and from job to job on the same machine. The edges of the impressions are particularly sharp on the laser-engraved steal printing plates in order to print crisp, well defined images on the cans. While these sharp edges are desirable for creating high quality images, they also tend to tear up the form rollers rather quickly. For example, six to eight hours is often the expected life for conventional form rollers inking laser-engraved printing plates in a modern high speed drink can printing machine operating at 1,800 to 2,000 cans per minute. The form rollers 20a-20c may therefore be considered the determinative sacrificial components setting the duty cycle of the machine, which turns out to be six to eight hours between shutdowns when utilizing laser-engraved printing plates due to breakdown of the form rollers. Any improvement in form rollers durability can therefore be expected to translate directly into improved machine duty cycle and produce a corresponding improvement in overall printing capacity and efficiency.

FIG. 2 is a conceptual front view of a representative high durability print form roller 20. Like many conventional form rollers, the innovative form roller 20 may include a homogeneous elastomeric roller body 21 on a shaft 23. The innovative elastomer composition may also be used as an outer layer of a multi-layer roller body if desired. A temporary shaft 23 used for fine grinding is typically inserted into an individual roller after the coarsely ground roller has been removed from a mandrel used to manufacture a roll blank from which a number of rollers are cut. Alternatively, the roller without a shaft may be held in place between a collet and tail stock on the grinding machine during the fine grinding process. While rollers have been developed using multiple layers of different materials, this particular elastomer heavy roller 20 benefits from the ease in manufacturing and cost advantages of a single stage or homogeneous roller body 21. Further advantages arise from the specific predominantly elastomer composition and associated process for manufacturing the roller summarized in routine 30 shown the logic flow diagram of FIG. 3. Those skilled in the industry will recognize the marked differences between from the manufacturing procedures 30 and those presently utilized for conventional form rollers with relatively high oil content.

Routine 30 begins with step 32, in which the ingredients are mixed in a slow mill mixing process for at least about an hour. The ingredients are predomated by a combination of elastomers, a filler, and a curing agent. Although oil may be introduced as a softener it has been found that this procedure may be successfully utilized without the need for any oil-based softening agent. Mill mixing the ingredients slowly is more time consuming than the chopping mixers usually utilized in form roller manufacturing but has the advantage of drawing the material into long strands rather than repeatedly chopping the material during the mixing process. Step 32 is followed by step 34, where the admixture is drawn into ribbons which are cut into long lengths, such as about 30 foot [9 m] lengths about four inches [10 cm] wide. Step 34 is followed by step 36, where the ribbons are coated with a suitable powder, such as zinc stearate, to keep the ribbons from sticking to each other and other surfaces. Step 36 is followed by step 38, where the ribbons are slowly heated to a working temperature, such as 180° F., for example by passing the material through a heating extruder twice. The material may be stored in the powder coated ribbon format at room temperature for at least several days to accommodate batch processing.

Step 38 is followed by step 40, where the ribbons are drawn out and wrapped onto a mandrel to build up a roll blank. FIG. 4 is a conceptual illustration of this process, where a series of ribbons 60 are drawn and wound onto a mandrel to create the roll blank 62. A typical roll blank may be sufficient to cut six 5-inch [12.7 cm] individual rollers from the blank; a blank about three feet [0.9 m] long is sufficient for this purpose. The blank should also be slightly larger diameter than the maximum desired roller diameter to allow grinding to size. As the finished rollers are typically in the range of about 3⅛ [7.9 cm] inches to about 3¾ [9.5 cm] inches, a blank built up to the range of about 3³⁄₁₆ inches [0.95 cm] to about 4 inches [10.2 cm] is generally sufficient (e.g., about 0.030 inches [0.08 cm] over the finished roller diameter may be a suitable standard). Step 40 is followed by step 42, where the roll blank is wrapped in plastic and, in step 44, cured typically by heating in an autoclave to about 270° F. for at least about 5.5 hours prior to grinding. Other types of curing may be utilized depending on the type of curing agent included in the composition. For example, an exothermic additive may facilitate curing while the roll blank rests without external heating, an internal catalyst may facilitate the curing process, the roll blank may cure as it dries at room temperature, and so forth depending on the type of curing agent included in the composition.

Figure 6:
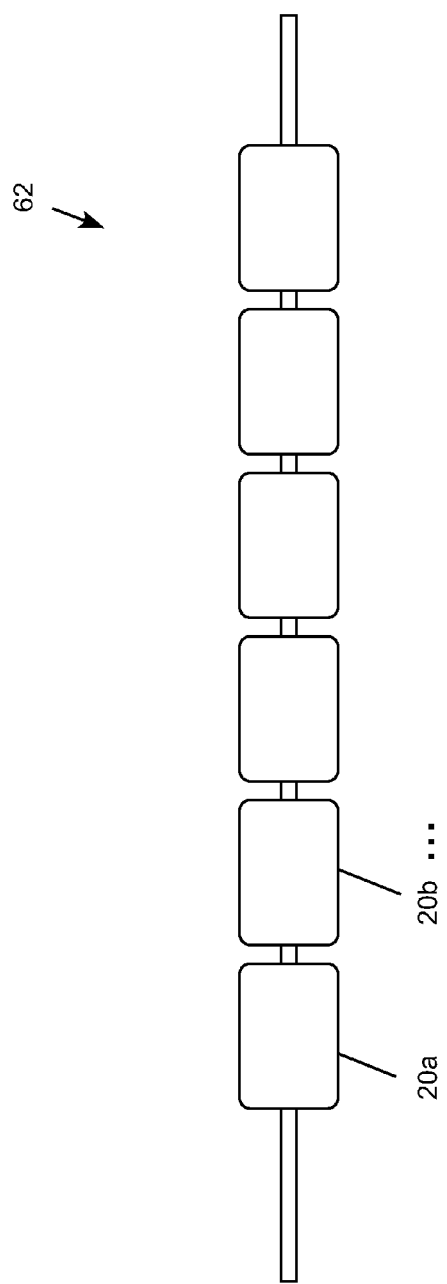
FIG. 6 is a conceptual front view of a number of high durability pliable print rollers on a common mandrel as part of the process for manufacturing the high durability pliable print rollers.

After removal from the autoclave, cooling and unwrapping, step 44 is followed by coarse grinding in step 46. Unlike traditional oil-softened rollers, the corners of the blank should be beveled prior to grinding to prevent binding at the edge. This is shown in FIG. 5, which conceptually illustrates the beveled corners 64 on the blank 62. Coarse grinding (also referred to as hogging) should also be slower than traditional form roll grinding. For example, a coarse grinding wheel 66 spinning at about 7,000 rpm with a linear travel rate of about seven inches [17.8 cm] per minute has been found suitable for the coarse grinding stage. The roll blank 62 is then cut into a number individual rollers 20a-n (usually about five or six per mandrel) within about 0.030 of an inch of the desired finished six, as shown in FIG. 6.

Figure 7:
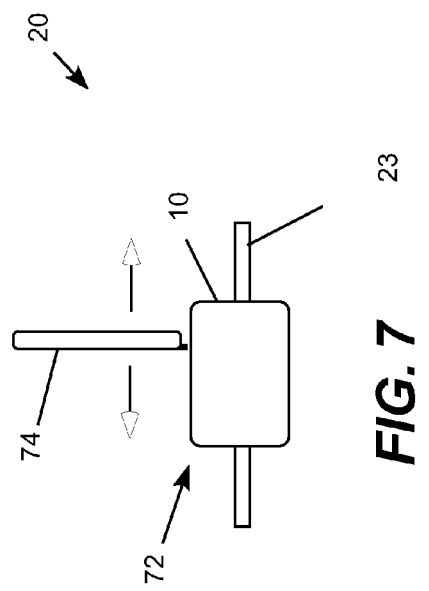
FIG. 7 is a conceptual front view of an individual pliable on a shaft with beveled corners during fine grinding as part of the process for manufacturing the high durability pliable print rollers.

Step 46 is followed by step 48, where, unlike the conventional process, the roll blank is allowed to rest overnight (e.g., at least about 12 hours) between coarse grinding and fine grinding (finishing stage). The individual rollers 20a-n are then removed from the common mandrel and each roller (represented by the individual roller 20 in FIG. 7) is a shaft 23 for fine grinding. Step 48 is followed by step 50, where fine grinding brings the individual roller 20 down to the desired diameter as shown in FIG. 7. Fine grinding with a fine grinding wheel spinning at about 7,000 rpm with a linear travel rate of about 2½ inches [6.35] per minute has been found suitable for the fine grinding stage. A finished roller tolerance of 1.5 to 1.0 thousands of an inch [0.038 mm to 0.025 mm]] has been achieved, which produces excellent print quality compared to conventional form rollers utilized in the industry.

FIG. 8 is an exemplary ingredient table 80 for an example composition for of a particular oil-free embodiment of the high durability pliable print roller. This particular mixture, expressed in parts by weight, includes about 100 parts [67%] elastomer, about 35 parts [23%] filler, about 4 parts [3%] curing agent, and about 11 parts [7%] other additives for a total of 150 parts. Note than zero oil is typically added as a softening agent (although some of the components may inherently include some level of oil content) in this particular composition. Although essentially no oil (e.g., less than one percent) is generally added, oil or another softening agent may be added as a matter of design choice. The elastomer in this particular example is about 75% polyisoprene (i.e., natural latex or synthetic rubber forms about 50% of the total composition) and about 25% polybutadiene (about 16.7% of the total composition). The filler in this example is ordinary silica (silicon dioxide) and the curing agent is ordinary dicumyl hydrogen peroxide. It will be appreciated that these main ingredients are inexpensive and readily available. The other ingredients typically include an ordinary pigment, antioxidant, and antiozonant.

The improvement in durability experienced with the high durability form roller has been extraordinary. Printing life of 72 hours or more has been experienced in high speed print can printers utilizing laser engraved steel printing plates compared to six to eight hours for conventional oil-softened form rollers applying comparable ink thickness. The overall softness of the roller is about 55 shore durometer, which is significantly softer than the 60-65 shore durometer conventional form rollers. The new pliable print rollers experience considerably improved measured resilience. For example, test disks of the new roller material with a 55 shore durometer typically registers about 60% on a bouncing plumbob-type resiliometer test (i.e., a falling plumbob on a guide rod bounces off the test disk to a height of 60% of the height from which it is dropped) as compared to about 20% to 30% for typical oil-softened roller materials with a 60-65 shore durometer. And a compression recovery test provides another measure of the resilience of the new roller material, where 99.6% recovery has been measured after 26.8% compression (i.e., a 0.500 inch [1.270 cm] disk squashed to 0.366 inch [1 cm] recovers to 0.498 inch [1.265 cm]).

Although the bounce and compression described above help to express the improved performance characteristics, the most significant difference lies in the improved surface tear and slough off resistance in the particular operating environment of the drink can printing machine for which the form roll is intended, leading to a five- to ten-fold increase in useful roller life. At least a portion of the this improvement is believed to be attributable to the fact that the new roller experiences significantly increased surface durability with lower overall softness, which allows the high durability roller to print a similar line width at a significantly lower roller pressure, which translates to lower energy utilization, lower heat generation, and longer roller life.

It will be understood that the material composition and manufacturing process may be varied somewhat, and that a small amount of oil or other softener may be added, if desired, to vary the characteristics of the roller. It is expected, in particular, that engineers will vary the mixture somewhat to find the most beneficial balance between roller life and energy consumption given new base performance standards established by the high durability pliable print roller described above.

In view of the foregoing, it will be appreciated that present invention provides significant improvements in pliable print rollers for industrial printing machines, such as drink can printing machines. The foregoing relates only to the exemplary embodiments of the present invention, and that numerous changes may be made therein without departing from the spirit and scope of the invention as defined by the following claims.

The invention claimed is:

1. A method for manufacturing a pliable roller for an industrial printing machine, comprising the steps of:
   combining ingredients including elastomer, filler, curing agent, and optionally other additives;
   mill mixing the ingredients for at least about an hour to create a homogeneous composition;
   forming a ribbon of the composition;
   powder coating the ribbon;
   heating the ribbon to a working temperature;
   drawing out and wrapping the ribbon onto a mandrel or onto an inner layer to create a roll blank;
   covering the roll blank with plastic;
   curing the roll blank;
   coarse grinding;
   fine grinding; and
   cutting the roll blank into a number of individual rollers.

2. The method of claim 1, wherein:
   the elastomer comprises about 67% of the composition;
   the filler comprises about 23% of the composition;
   the curing agent comprises about 3% of the composition; and
   the other additives comprise about 7% of the composition.

3. The method of claim 2, wherein the elastomer comprises polyisoprene and polybutadiene.

4. The method of claim 3, wherein the elastomer consists essentially of 75% polyisoprene and 25% polybutadiene.

5. The method of claim 4, wherein the filler consists essentially of silica, the curing agent consists essentially of hydrogen peroxide, and the other additives consist essentially of pigment, antioxidant, and antiozonant.

6. The method of claim 1, wherein the curing step comprises heating the roll blank to about 270° F. for at least about 5.5 hours.

7. The method of claim 5, further comprising the step of allowing the roll blank to rest for at least about 12 hours between coarse grinding and fine grinding.

* * * * *